Aug. 17, 1926.

V. L. G. WILT 1,596,328

ORAL FLUOROSCOPE

Filed Dec. 26, 1922

INVENTOR,
Verne L. G. Wilt;
BY
Blakeslee & Brown,
ATTORNEYS.

Patented Aug. 17, 1926.

1,596,328

UNITED STATES PATENT OFFICE.

VERNE L. G. WILT, OF LOS ANGELES, CALIFORNIA.

ORAL FLUOROSCOPE.

Application filed December 26, 1922. Serial No. 608,907.

This invention relates to oral fluoroscopes, and has for an object the provision of a device adapted to permit a person to observe with safety, instantly, and directly, normal and pathological conditions affecting the calcific density that obtains in the structures of the dental arches and adjacent the soft tissues. With a device of this character it is possible for an observer to examine impacted teeth, crooked and fused tooth roots, broken fragments of roots, degree of calcification of teeth, presence and position of permanent teeth under deciduous teeth, size and strength of jaw bones, necrotic and rarefied areas in the bones; size and position of foreign bodies which have radiopacity; amount of bone destruction in pyorrhea alveolaris; fracture of the jaw bone; location and size of salivary deposits in salivary glands and their ducts; foreign bodies in the maxillary sinuses; presence of cysts; diagnostic wires in root canal treatment; and any other condition which produces a variation in the calcific density of oral structures.

In practicing the invention I provide a device which may be tubular in form and carries within its tube a lens. One end of said tube is adapted to receive a fluoroscopic screen and the observer looks through the opposite end. An X-ray is brought into use and the oral fluoroscope is inserted into the mouth with the fluoroscopic screen directed toward the teeth to be examined. When the X-ray is in operation it is possible to directly determine various calcific densities of the various tooth structures in accordance with the above uses, as just stated. An instrument of this character does not eliminate the use of intra-oral and extra-oral radiograms, as such radiograms constitute a permanent record of the structures. As it is necessary, however, in the case of said radiograms to wait a definite length of time before a latent image can be obtained, this instrument offers an immediate view of the case under examination.

With the above and other objects in view, the invention consists in the novel and useful formation, construction, interrelation and combination of the various parts, members and features, all as shown in the embodiment in the accompanying drawing, described in the following statement, and finally pointed out in the claim.

In the drawing.

Corresponding parts in all the figures are designated by the same reference characters.

Figure 1:
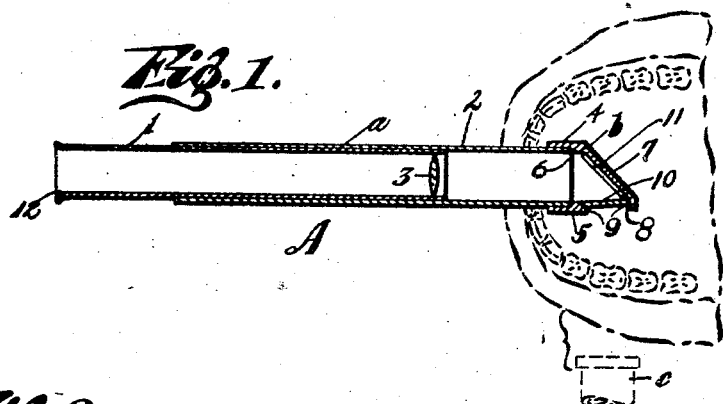
Figure 1 is a fragmentary longitudinal view, the parts being shown in section, of the improved oral fluoroscope in position within the mouth for the purpose of examining the structures of the dental arches.
Figure 2:
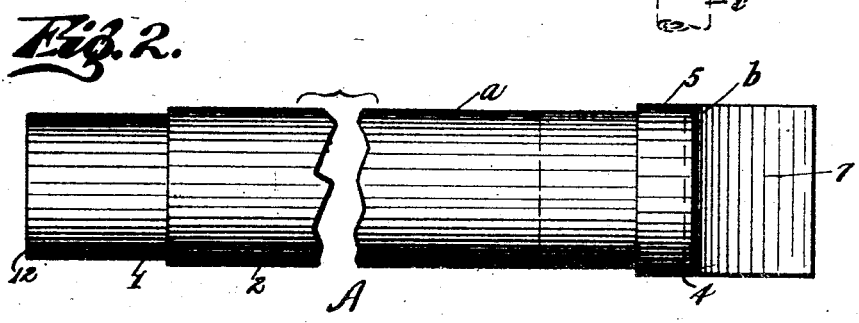
Figure 2 is a fragmentary, longitudinal view, on an enlarged scale, of the improved oral fluoroscope shown in Fig. 1.

Referring with particularity to the drawing, A designates as an entirety the improved fluoroscope, of which $a$ is the body thereof and $b$ a member adapted to render visible variations in the calcific density of the oral structures. The body $a$ may be tubular in formation, having one tube as 1 slidable within a second tube 2, with the tubular member 1 provided with a lens 3. The tubular member 2 is adapted to carry at its free end the member $b$, and the member $b$ shown in Figures 1 and 2 includes a casing 4 which is annular in part, as shown at 5, and provided with an annular flanged shoulder 6. The annular part 5 is passed over and secured on the free end of the tubular member 2 abutting against the shoulder 6. The member $b$ likewise includes an end part 7 which is angularly directed with respect to the annular member 5 and is likewise relatively flat, as shown in Figure 2. A portion of the casing 4 is open, as shown at 8. It will thus be noted that the part $b$ is really provided with an annular piece for reception on the tubular member 2 and with a terminal or head which is triangular in shape. The slope of the part 7 is preferably at a 45 degree angle with respect to the longitudinal axis of the body $a$. The member $b$ surrounding the opening 8 may be flanged, as shown at 9 so as to hold within said part $b$ a fluoroscopic screen 10, said screen closing the opening 8, as shown in Figure 1. Likewise within the member $b$ is a mirror or other reflecting surface 11, said surface being attached to the inner surface of the wall 7. When the device A is inserted within the mouth of a patient an X-ray $c$ is brought into position so that the rays from the same may be directed toward the structures of the dental arches, as shown in Figure 1, and the fluoroscopic screen 10 is likewise directed toward said dental arches. By placing the eye at the open end 12 of the tubular member 1 it is possible to observe the normal and pathological conditions of the structures, and adjustment of the tubular members 1 and 2 relative to each other will permit proper focusing of the lens. In this connection it is to be observed that the fluoroscopic screen is slightly angled with relation to the longitudinal axis of the body $a$. This permits the device A to be moved conveniently within the mouth for observation of the dental arches without the necessity of the device assuming too great an angularity with respect to said dental arches. Thus in Figure 1 it is possible to follow the general contour of the dental arches very easily by a slight side movement of the device A. The shadow effects produced on the fluoroscopic screen are transmitted to the reflecting surface 11 and from thence through the lens 3 to the eye of the observer.

Figure 3:
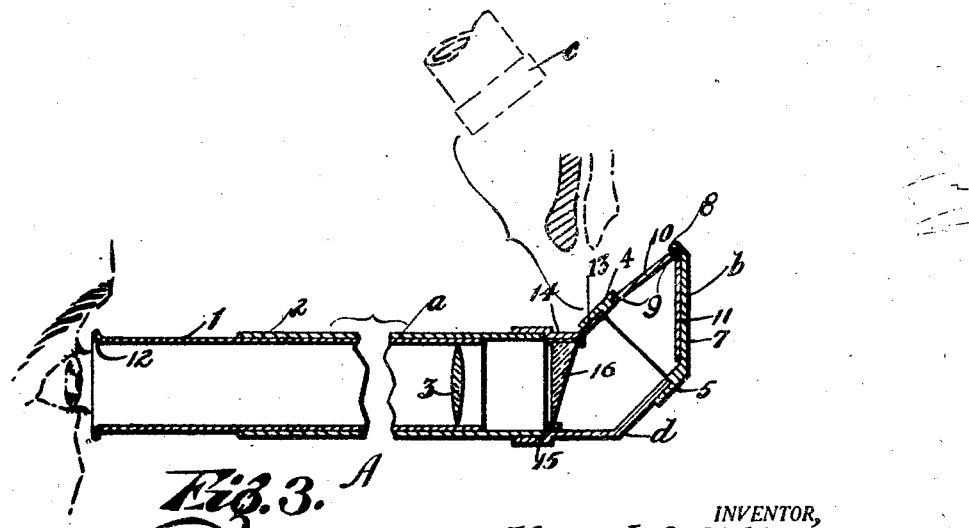
Figure 3 is a fragmentary longitudinal view, the parts being shown in section, of a modified form of the device.

It may be that a greater angularity is desired of the member $b$, and this is accomplished by providing a member $d$, as shown in Figure 3, the other parts being similar. The member $d$ includes a tube having angularly related portions 13 and 14, the part 14 being annularly stepped as shown at 15 so that the tube 2 may be received within the stepped portion 15. Likewise the part 14 carries a prism 16 and the member $b$ is received on the part 14 of the member $d$. Thus any shadows or other impressions received on the fluoroscopic screen 10 will be transmitted to the reflecting surface 11, and thence to the prism 16, the prism in turn transmitting the rays in straight lines and parallel to the longitudinal axis of the body $a$.

As a summary it will be seen that the invention contemplates a small hand instrument providing means whereby dental arches may be directly viewed by an observer with the said instrument carrying a fluoroscopic screen and with parts within the instrument for reflecting the vision on said fluoroscope screen to the eye of the observer.

It is obvious that various changes and modifications may be made in departure from the particular description as given, but that said modifications and changes may be made within a fair interpretation of the invention as defined by the scope of the appended claim.

Having thus disclosed my invention, I claim and desire to secure by Letters Patent:

In a device of the character disclosed, a tube, a second tube telescopically received within said first tube, a lens within said second tube, a member carried at an end of said first tube, a prism within said member, said member being substantially cylindrical in form and having one portion thereof at an angle to a second portion thereof, a casing carried on the second portion of said member, a fluoroscopic screen carried by said casing, and a reflecting portion within the said casing, said reflecting portion reflecting the light impressions received on said fluoroscopic screen to said prism and from said prism through said lens of the first tube.

In testimony whereof, I have signed my name to this specification.

VERNE L. G. WILT.